Figure 1:
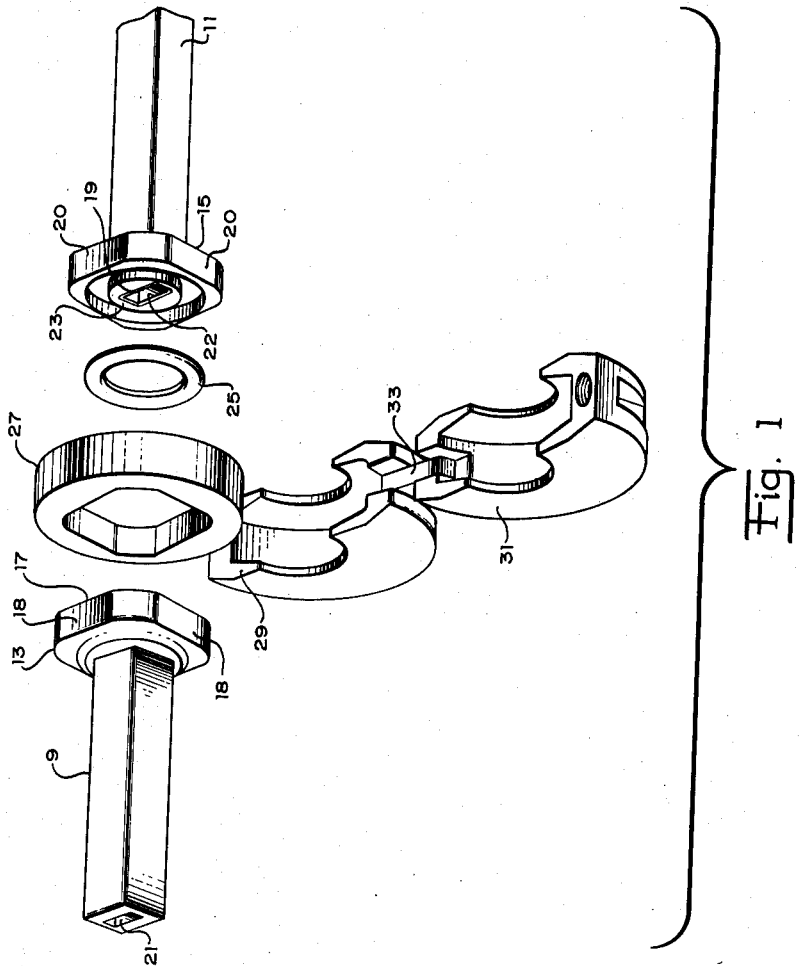

INVENTORS
EDWARD H. PHILLIPS
JAMES W. VAUGHAN

ATTORNEY

United States Patent Office 3,076,159
Patented Jan. 29, 1963

3,076,159
WAVEGUIDE COUPLING APPARATUS
James W. Vaughan, Palo Alto, and Edward H. Phillips, Mountain View, Calif., assignors to Hewlett-Packard Company, Palo Alto, Calif., a corporation of California
Filed Sept. 29, 1961, Ser. No. 141,653
5 Claims. (Cl. 333—98)

This invention relates to waveguide couplings and more particularly to easily detachable couplings which provide high waveguide alignment accuracy and low microwave energy leakage.

Several pieces of microwave equipment are frequently coupled together to form complete testing or signalling systems. These pieces of equipment are usually joined by means of abutting flanges held together with bolts or clamps. High alignment accuracy of waveguide passages at these junctions is essential for maintaining good microwave transmission substantially free of reflections. Sections of waveguide equipment for operation at relatively low frequencies have flanges which are generally machine lapped to provide substantially flat abutting surfaces and which are provided with fastener holes that are accurately located with respect to the waveguide passages. These flanges are thus both aligned and held together by close fitting bolts passing through the fastener holes. Waveguide junctions of this type are relatively easily detachable and are substantially free of microwave leakage when properly assembled.

Alignment accuracy of waveguide junctions becomes more critical as the operating frequencies increase and the waveguide dimensions decrease. Higher frequency waveguide equipment is thus generally provided with coupling flanges having both fastener holes and press-fitted alignment pins. These flanges are less easily detachable and are usually more difficult to assemble. In addition, the press-fitted aligning pins frequently distort the lapped flange surfaces and thereby cause microwave leakage about the assembled coupling.

Waveguide equipment for operation at extremely high microwave frequency, say about fifty kilomegacycles, should be coupled together with extremely high alignment accuracy. Several coupling schemes including the scheme which uses alignment pins as previously described have been used, each with concomitant disadvantages. One other such coupling scheme uses mating flanges, each having diametrically opposed flat flange edges. These flat edges are engaged by diametrically opposed protrusions or lips disposed about the edges of the mating flange. The surfaces of the flanges remote from the abutting surfaces are tapered. A clamp which is adapted to encircle the assembled flanges is provided with an inner annular groove having a similar taper. Tightening the clamp about the flanges thus forces the abutting surfaces together and provides a rigid joint. This scheme has several disadvantages, the most salient of which is the extreme difficulty encountered in producing lapped abutting flange surfaces for low microwave leakage.

It is therefore an object of the present invention to provide a waveguide coupling which is easily detachable and which provides high alignment accuracy.

It is another object of the present invention to provide waveguide coupling apparatus which is relatively inexpensive to manufacture and which provides a waveguide joint having negligible microwave leakage.

In accordance with the illustrated embodiment of the present invention flanges are provided at the ends of waveguide sections. These flanges are provided with a number of flat edges or reference surfaces which are accurately positioned with respect to the waveguide passages. The abutting surfaces of the flanges are machine lapped and the back surfaces of the flanges are tapered. A ring having a thickness that is substantially equal to the sum of the flanges at the outer edges thereof is positioned about the abutting flanges. The inner aperture of the ring has a shape that is substanially the same as the cross-sectional shape of the flanges. A clamp which is adapted to be positioned about the assembled flange joint is provided with an inner annular groove. The side walls of the groove are tapered similar to the taper on the back surfaces of the flanges. The waveguide joint of the present invention is thus held rigid by tightening the clamp about the flanges which are held in precise alignment by the encircling ring. A fluid-tight seal may be obtained by providing recessed annular grooves in the lapped flange surfaces and by so positioning a resilient sealing ring within the grooves that the ring is compressed therein when the flanges are rigidly joined.

Figure 2:
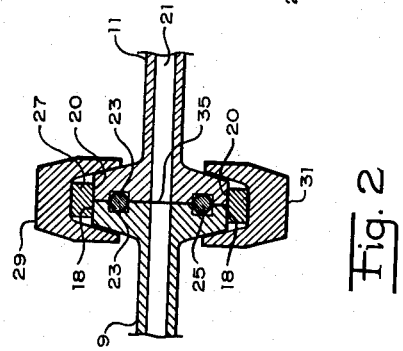

Other and incidental objects of the present invention will be apparent from a reading of this specification and an inspection of the accompanying drawing in which:

FIGURE 1 is an exploded view of the coupling showing the various relationships between component parts, and FIGURE 2 is a cross-sectional view of the assembled coupling.

Referring now to FIGURE 1, there are shown end portions 9 and 11 of waveguide equipment which are to be joined. These end portions are fitted with identical flanges 13 and 15, which flanges have abutting lapped surfaces 17 and 19. The flat or reference surfaces 18 on the edges of the flange 13 and the reference surfaces 20 on the edges of flange 15 are accurately located with respect to the waveguide passages 21 and 22. The back surfaces of flanges 13 and 15 are tapered toward the lapped surfaces 17 and 19. An annular groove 23 is provided in the lapped surfaces of each of the flanges to receive a resilient sealing ring 25. An aligning ring 27 having a thickness that is substantially equal to the sum of the flange thicknesses is provided with an inner aperture having a shape that is substantially the same as the cross-sectional shape of the lapped surfaces. This inner aperture may be broached or internally ground to shape with extremely high dimensional accuracy. When assembled, the waveguide passages in each of the end portions 9 and 11 are held in axial and rotation alignment by the reference surfaces of the flanges closely fitted within the inner aperture of the ring 27. A clamp which contains two half-sections 29 and 31 hinged together with hinge bar 33 is adapted to encircle the abutting flanges 13 and 15 and aligning ring 27. The clamp is provided with an inner annular groove having side walls that are tapered to mate with the tapered back surfaces of the flanges. Thus, as the clamp is tightened about the assembled coupling, the flanges are forced into abutting engagement, thereby forming a rigid waveguide joint.

Other suitable means may be used to maintain the flanges in abutting engagement and to hold the coupling rigidly together. These means may include internally and externally threaded cups which enclose the assembled coupling and draw the flanges into abutting engagement when tightened.

Referring now to FIGURE 2, there is shown a cross-sectional view of the assembled waveguide coupling. The lapped flange surfaces 17 and 19 of FIGURE 1 form the planar joint 35. The resilient sealing ring 25 deforms within the annular groove 23 to form a fluid-tight seal between the end portions 9 and 11. The surfaces of the inner aperture of ring 27 are closely fitted about the reference surfaces 18 and 20 on each of the flanges. The hinged sections 29 and 31 of the outer clamp are drawn tightly about the flanges 13 and 15. A flange-engaging force that is parallel to the waveguide passage 21 is thus produced by the mating tapered surfaces on the flanges 13 and 15 and on the half-sections 29 and 31 of the clamp. Thus, by tightening the clamp sections together about the abutting flanges 13 and 15, using suitable screw means, a rigid waveguide joint is formed which has negligible microwave energy loss and which may be made fluid-tight for use in gas-filled systems.

The waveguide coupling apparatus of the present invention thus permits easy detachment of the waveguide equipment. In addition, high alignment accuracy is provided using relatively inexpensive manufacturing processes. Further, since the abutting flange surfaces are machine lapped, microwave leakage about the assembled joint is reduced to a negligible amount. This is so independently of the means used to hold the flanges together since the lapped surfaces of the flanges obviate the need for additional radiation shielding. Spurious resonances due to the formation of cavities and energy passages about the joint are thus eliminated.

We claim:

1. Apparatus for joining sections of waveguide comprising the combination of flanges on the ends of each of the waveguide sections to be joined, each of said flanges having an outer surface normal to the axis of the waveguide section, reference surfaces on the edges of the flanges, said reference surfaces being normal to said outer surfaces, at least one reference surface on each of said flanges being so disposed that points along its length are non-equidistant from the axis of the waveguide, a ring positioned about the waveguide flanges, said ring having an inner aperture having a shape substantially the same as the shape of the reference surfaces on the edges of said flanges, and means producing engaging forces on each of the flanges parallel to said waveguide axes, whereby the waveguide sections are aligned and rigidly joined under the influence of the engaging forces.

2. Apparatus for joining sections of waveguide comprising the combination of flanges on the ends of each of the waveguide sections to be joined, each of said flanges having an outer surface normal to the axis of the waveguide passage in said section, reference surfaces on the edges of the flanges, said reference surfaces being normal to said outer surfaces and being accurately positioned with respect to the waveguide passages, a reference surface on each of said flanges being so disposed that points along its length are non-equidistant from the axis of the waveguide passage, a ring positioned about the waveguide flanges, said ring having an inner aperture having a shape substantially the same as the shape of the reference surfaces on the edges of said flanges, and means producing engaging forces on each of the flanges parallel to the axes of said waveguide passages, whereby the waveguide sections are aligned and rigidly joined under the influence of the engaging forces.

3. Apparatus for joining sections of waveguide comprising the combination of flanges on the ends of each of the waveguide sections to be joined, each of said flanges having an outer surface normal to the axis of the waveguide passage in said section, reference surfaces on the edges of the flanges, said reference surfaces being normal to said outer surfaces and being accurately positioned with respect to the waveguide passages, a plurality of reference surfaces on each of said flanges being so disposed that points along their lengths are non-equidistant from the axis of the waveguide passage, a ring positioned about the waveguide flanges, said ring having an inner aperture having a shape substantially the same as the shape of the reference surfaces on the edges of said flanges, and means producing engaging forces on each of the flanges parallel to the axes of said waveguide passages, whereby the waveguide sections are aligned and rigidly joined under the influence of the engaging forces.

4. Apparatus for joining sections of waveguide comprising the combination of flanges on the ends of each of the waveguide sections to be joined, each of said flanges having an outer surface normal to the axis of the waveguide passage in said section, reference surfaces on the edges of the flanges, said reference surfaces being normal to said outer surfaces and being accurately positioned with respect to the waveguide passage, a plurality of reference surfaces on each of said flanges being so disposed that points along their lengths are non-equidistant from the axis of the waveguide passage, a ring positioned about the waveguide flanges, said ring having an inner aperture having a shape substantially the same as the shape of the reference surfaces on the edges of said flanges, a clamp disposed about the abutting flanges and ring and being adapted to produce engaging forces on each of the flanges parallel to the axes of the waveguide passages, whereby the waveguide sections are aligned and rigidly joined under the influence of the engaging forces.

5. Apparatus for joining sections of waveguide comprising the combination of flanges on the ends of each of the waveguide sections to be joined, each of said flanges having a planar outer surface normal to the axis of the waveguide passage in said section and having a tapered back surface remote from said outer surface, a plurality of reference surfaces on the edges of each of the flanges normal to said outer surfaces, the reference surfaces on each of said flanges being so disposed that points along their lengths are non-equidistant from the axis of the waveguide passage, a ring positioned about the abutting waveguide flanges, said ring having an inner aperture having a shape substantially the same as the shape of the reference surfaces on the edges of said flanges, a clamp including separable half-sections and adapted to encircle the abutting flanges and ring, said half-sections having internal grooves disposed to receive the abutting flanges and ring, the grooves having tapered side walls which mate with said tapered back surfaces, and means to tighten said half-sections about the abutting flanges, whereby said tapered surfaces impart engaging forces to the flanges parallel to the axes of the waveguide passages.

References Cited in the file of this patent

UNITED STATES PATENTS

| | | |
|---|---|---|
| 2,643,139 | Hamilton | June 23, 1953 |
| 2,738,207 | Twigg | Mar. 13, 1956 |
| 2,788,498 | Hardaway | Apr. 9, 1957 |
| 2,937,893 | Hill et al. | May 24, 1960 |